United States Patent
Bohnet et al.

(10) Patent No.: US 9,145,998 B2
(45) Date of Patent: Sep. 29, 2015

(54) SYSTEM FOR SEALING A PIPELINE SYSTEM

(75) Inventors: Hans Bohnet, Schoemberg (DE); Jens Eitel, Wildbad (DE)

(73) Assignee: Rumailha—Comercio Internacional e Servicos LDA & Comandita, Madeira (PT)

( * ) Notice: Subject to any disclaimer, the term of this patent is extended or adjusted under 35 U.S.C. 154(b) by 786 days.

(21) Appl. No.: 13/208,005

(22) Filed: Aug. 11, 2011

(65) Prior Publication Data

US 2012/0086174 A1  Apr. 12, 2012

Related U.S. Application Data

(60) Provisional application No. 61/384,090, filed on Sep. 17, 2010.

(30) Foreign Application Priority Data

Aug. 12, 2010  (DE) ................ 20 2010 011 337 U (51) Int. Cl.
| | |
|---|---|
| *F16L 23/00* | (2006.01) |
| *F16J 15/46* | (2006.01) |
| *F16L 55/163* | (2006.01) |
| *F16L 37/62* | (2006.01) |
| *F16L 55/134* | (2006.01) |
| *F16L 17/10* | (2006.01) |
| *B29C 73/32* | (2006.01) |

(52) U.S. Cl.
CPC ............ *F16L 55/163* (2013.01); *F16L 17/10* (2013.01); *F16L 37/62* (2013.01); *F16L 55/134* (2013.01); *B29C 73/32* (2013.01)

(58) Field of Classification Search
CPC ............ F16L 17/00; F16L 17/06; F16L 17/10
USPC .......... 277/602, 605, 608, 611, 613, 616, 627
See application file for complete search history.

(56) References Cited

U.S. PATENT DOCUMENTS

| | | | | | |
|---|---|---|---|---|---|
| 3,958,313 | A | * | 5/1976 | Rossborough | 29/890.14 |
| 4,234,781 | A | * | 11/1980 | Flink | 219/243 |
| 4,342,336 | A | | 8/1982 | Satterthwaite et al. | |
| 4,593,727 | A | * | 6/1986 | Ulveling | 141/5 |
| 4,819,565 | A | * | 4/1989 | Bechu | 105/11 |
| 4,993,722 | A | * | 2/1991 | Gundy | 277/314 |
| 5,562,295 | A | * | 10/1996 | Wambeke et al. | 277/605 |
| 5,741,015 | A | * | 4/1998 | Skinner | 277/559 |
| 5,826,887 | A | * | 10/1998 | Neumann et al. | 277/605 |
| 5,859,388 | A | * | 1/1999 | Allen et al. | 174/77 R |
| 5,901,962 | A | * | 5/1999 | Wambeke | 277/312 |
| 5,979,909 | A | * | 11/1999 | Wambeke | 277/605 |

(Continued)

FOREIGN PATENT DOCUMENTS

GB        2080914 A  *  2/1982  ............. F16L 55/12

*Primary Examiner* — Gilbert Lee
(74) *Attorney, Agent, or Firm* — Muncy, Geissler, Olds & Lowe, P.C.

(57) ABSTRACT

A system is provided that includes a fluid-tight tube, which for insertion can be introduced into the area of a gap to be sealed between two pipes of the pipeline system to be sealed. The tube is provided with a feed element for introducing a fluid, with whose aid the tube is filled and thereby increased in its volume. The feed element contains a valve, which facilitates the introduction of the fluid and at the same time prevents the outward flow via the feed element.

23 Claims, 3 Drawing Sheets

(56) References Cited

U.S. PATENT DOCUMENTS

| | | | |
|---|---|---|---|
| 6,328,310 B1 * | 12/2001 | Chikaraishi | 277/314 |
| 6,607,219 B2 * | 8/2003 | Mirales et al. | 285/236 |
| 7,603,752 B2 * | 10/2009 | Heath et al. | 24/25 |
| 2002/0190478 A1 * | 12/2002 | Mirales et al. | 277/576 |

* cited by examiner

SYSTEM FOR SEALING A PIPELINE SYSTEM

This nonprovisional application claims priority to German Patent Application No. 20 2010 011 337.7, which was filed in Germany on Aug. 12, 2010, and to U.S. Provisional Application No. 61/384,090, which was filed on Sep. 17, 2010, and which are both herein incorporated by reference.

BACKGROUND OF THE INVENTION

1. Field of the Invention

The invention relates to a system for sealing a pipeline system, which is suitable directly for sealing of man-sized pipe systems, as can be used in sewer lines.

2. Description of the Background Art

There are various techniques for this type of sealing. For example, DE 40 23 211 A1 discloses that the pipe is lined across its entire surface completely from inside first with a fabric and then this fabric is provided from the inside of the pipe with a tube, which is filled with a fluid, so that the pipe to be sealed is completely lined by a double layer of fabric and a rubber-like tube and thereby the leaky place is sealed as well. This type of system proves to be very complex and cost-intensive in its use.

Further, German Utility Model No. G 85 01 676.4 discloses sealing a gap between two pipes by pressing a sealing collar in the form of a tension band from the inside onto the abutting pipe ends forming a gap. In this case, the tension band is formed of fiberglass-reinforced plastic. The sealing in this system occurs between the inside of the pipes and the sealing collar, which is pressed over two tension bands rigidly onto the inside and thereby seals the gap between the pipe ends. This system proves to be inflexible and is laborious.

Further, German Utility Model No. DE 295 190 73 U1 discloses a sealing collar for use in pipes for the purpose of sealing leaking sites, the collar which includes a ring-shaped expandable band which is bent together and made of sheet steel. The ends of said sheet steel should overlap and are braced apart by means of a locking device in the form of a slot, disposed on the interior band end in the circumferential direction and whose long side has a row of teeth; the bracing apart occurs with the aid of a pinion gear so that the locking device presses the band of the sealing inner collar against the inside of the pipeline and thereby creates the seal. This system proves to be complex to handle and very cost-intensive.

SUMMARY OF THE INVENTION

It is therefore an object of the invention to provide a system for sealing a pipeline system, which enables a reliable sealing of a pipeline system in the area of abutting pipes and is thereby simple to handle.

In an embodiment, the system of the invention has a fluid-tight tube, which for insertion can be introduced into the area of the gap to be sealed between two pipes of the pipeline system to be sealed. The tube is provided with a feed element for introducing a fluid, with whose aid the tube is filled and thereby increased in its volume. The feed element contains a valve, which facilitates the introduction of the fluid, whether in the form of a gas or particularly in the form of a liquid such as in particular water or an oil, and at the same time prevents the outward flow via the feed element. Said valve thereby has the function of a check valve. Highly different design options are known for the design of said valve and are selected depending on the size, pressure conditions, and fluid employed.

The feed element can be connected to a pump for conveying the fluid, after the tube was inserted in the area of the gap to be sealed or in particular into the gap to be sealed of the pipeline system. The tube is thereby inserted into the gap in the unfilled state, which facilitates the insertion in particular. If to seal a pipeline system the tube of the invention is inserted into the gap to be sealed, the fluid is introduced into the tube via the pump using the feed element, the tube expands and conforms to the gap, seals it by pressing especially against the side wall of the gap, i.e., the ends of the pipes to be sealed from one another, and this thereby assures that the gap to be sealed between the pipes is sealed reliably and securely. The insertion of the still unfilled or slightly filled tube is not very complex and can also be reliably realized under difficult spatial conditions. The subsequent filling of the tube by means of the fluid delivered by the pump of the invention is also not very complex and requires no complex device or a large space, so that the use of this system of the invention for sealing a pipeline system in the area of a gap between two pipes can be realized in an especially simple and secure manner.

The system of the invention is notable in that the sealing of the especially critical places between two pipes occurs in that it is not the inner surface of the pipe that is sealed by a wide band containing a plurality of components, as is described extensively in the state of the art, but as taught by the invention especially the gap as such is sealed directly with the aid of a fluid-filled tube, without a complicated device necessarily restricting the inside diameter of the pipe to be sealed substantially or markedly and thereby restricting the flow of the product to be transported through the pipe.

This system of the invention can eliminate in an especially simple way leaks or damage to the pipeline system, which are the most frequent cause of leaks, namely, those that arise through the imperfect alignment of the pipes and thereby through wedging of the pipe ends or the coupling of the pipe ends against one another. There are many leaks caused by these wedge-shaped openings, which form very rapidly during a change in the position of the sometimes man-sized pipes; each of these alone may not represent a formidable individual leak but as a whole they entail considerable leakage of the pipeline system and thereby damage to the environment. The system of the invention is especially suitable for eliminating and sealing such leakages. The use is not limited to this type of leakage, however; it can also be used efficiently and effectively in the case of larger gaps or cracks in a pipeline system. The system of the invention for sealing a pipeline system has proven especially effective in handling and in the sealing success.

It has proven especially advantageous to select the tube of a material, for example, of rubber or a rubber-like material, which through curing can form a secure and rigid and also tight connection. Apart from gluing, curing has proven to be an especially secure and reliable sealing type of connection. In a similar way, apart from curing, connection by welding has proven successful, particularly if in this case materials such as polytetrafluoroethylene (PTFE), ethylene vinyl acetate (EVA), polyethylene (PE), polyurethane (PUR), or polyamide (PA) are used. According to the invention, said material selection and this type of connection enable, in one respect, to securely patch the tube when needed by application of an additional element which has been applied to the surface of the tube and which is glued or cured with the tube, and thereby to eliminate undesirable leaks in the tube.

It is also possible according to an embodiment of the invention to connect an elongated tube to form a closed ring, in that the ends are glued together and in particular according to the invention are cured or welded together to form a closed ring. This ring can be formed in this case as a continuously closed tube with one or more continuous ring-shaped chambers. As an alternative to this, it has also proven successful to form one or more end pieces of the elongated tube as an end face without an integrated air chamber. In this case, said end face is connected overlapping with the other end of the tube by curing, welding, or also by gluing so that the end face after the connection rests in the area of the tube area of the other end, said area which is provided with one or more air chambers. As a result, a complete formation of one or more air chambers in the tube is assured, so that an especially effective sealing is achieved. The formation of the tube with two such end faces has proven especially advantageous.

The tube can be formed substantially of a material that is reinforced by the introduction of a fabric insert. A notable increase in the stability and stiffness of the tube is successfully achieved by said reinforcement and thereby damage to the tube during the insertion and operation is notably reduced. In this regard, the fabric insert is preferably formed of a textile fabric and/or of a metallic fabric. A sufficient flexibility with particular stability and resistance was successfully achieved by the use of textile fabric, particularly with use of carbon fibers or Kevlar fibers. Use of a multilayer fabric insert makes it possible especially to develop this flexibility and resistance particularly to mechanical or chemical stress. In this case, preferably the different layers are realized with different materials, different orientations, and/or different fiber thicknesses and connected together to form a complete fabric for the fabric insert. As a result, very specific tubes adapted to the different sealing situations of a pipeline system can be realized. Precisely in very dynamic pipe situations, for example, in earthquake zones or in areas where vibrations occur due to traffic movements, e.g., due to subways, it has proven successful to use especially robust and therefore mechanically resistant fabric inserts made of thin metallic fabric, which are supplemented in addition by a supplementary layer of thin textile fabrics. As a result, a very advantageous combination of mechanical stiffness and resistance strength, as well as flexible mobility, is achieved with the multilayer arrangement of textile fabric and metallic fabric.

It has proven especially well to provide the system for sealing a pipeline system according to the invention with a collar, which is formed particularly as resilient. Said collar is formed so that it can be inserted in the gap between the pipes to be sealed from one another and thereby comes to rest between the tube, inserted in the gap, and the interior of the pipeline system. In this regard, the collar is formed preferably so that it lies against the fluid-filled tube in the residual gap or at least in part against the tube in the gap. Preferably, in this case, the particularly resilient collar is formed and selected so that the collar extends laterally up to the ends of both pipes and thus covers the gap in a flat manner and thereby protects the tube, lying behind it, from mechanical damage by the product conveyed within the pipeline system. In this case, it has proven especially successful to form the collar from curved or V-shaped, resilient steel, particularly V4A steel or ship steel, which due to its curved or V shape has a flexibility in the direction of the spaced apart ends or legs of the V and thereby rests or can come to rest in the state in which it is inserted into the gap against the ends of the pipe over substantial parts of the ring-shaped gap. Due to the curved or V-shaped design, it is possible, moreover, to insert a spring ring in the collar, which presses the collar outward in the direction of the tube. As a result, a very secure seating of the collar in the gap is assured and thereby by selecting the suitable material and the spring ring a simple and secure insertion of the system for sealing is assured. An especially reliable arrangement of a resilient collar and tube is, moreover, achieved by the special form of the particularly curved or V-shaped collar.

It has proven especially advantageous to provide the system of the invention with a tube, which has not only one but a plurality of chambers which extend over the length of the tube, are fluid-filled, thereby expand the tube in the outer dimension, and thereby achieve a secure sealing in the area of the gap between two pipes. The extent of the expansion can be controlled very reliably by the formation of the different chambers and even a leak in a chamber can be compensated without the insertion of a new tube. Preferably, in this case, each separate chamber is assigned its own feed element with a valve for introducing the fluid. As a result, the different chambers can be filled or emptied selectively and situation-specific. Apart from the possibility of allowing the chambers to extend over the entire length of the tube, it has also proven successful to allow the chambers to overlap only partially, so that areas especially at risk are especially protected by two separate chambers, whereas other areas that are little affected are protected only by a single chamber, which is not a disadvantage because of the leak tightness in this area. This variant of the tube with a plurality of chambers is simple to manufacture.

It has proven especially successful to form the pipes to be sealed from one another so that the pipes to be sealed from one another form a coupling, whose inner pipe has a pipe end with a phase disposed at the outside diameter. This phase at the outside diameter of the internal pipe end makes it possible to insert the tube of the invention very deeply and lastingly into the gap between the two pipe ends, there to fill it with fluid, and in this area of the phase, which prevents a sliding out towards the pipe interior, to secure the position of the tube. A system easy to operate and with improved security for sealing a corresponding pipeline system is provided by this design of the system with pipes adapted thereto.

It has proven especially successfully to form the pipes to be sealed from one another so that in the assembled state they form a bell socket, which is disposed with a plastic seal between the bell and the associated other pipe end surrounded by the bell. Sealing of the pipeline system in the radial direction based on the pipeline system is achieved by this seal, which in conjunction with the fluid-filled tube of the system assures a very reliable and secure sealing of the pipeline system, because the radial sealing of the plastic seal together with the lateral and radial sealing of the tube forms a very effective combination of seals.

The system of the invention can also contain a protective ring, which is disposed on the inner wall in the area of the pipe gap provided with the tube of the invention so that the protective ring covers the gap with the tube on the inside of the two pipe ends and thereby prevents obstruction or damage to the tube by passing objects conveyed in the pipe, which could have sharp edges. Preferably, this protective ring covers the gap or the tube completely, so that there is no threat to the tube disposed in or at the gap. Preferably, the protective ring is formed of a plurality of segments, which can be connected to one another to form the protective ring. In this case, the segments are selected so that the segments, connected to one another and joined together to form a protective ring, have a protective ring with an outside diameter corresponding to the inside diameter of the annular gap to be sealed. In this way, the protective ring can be arranged in the area of the pipe gap to be sealed so that sliding past of objects behind the protective ring is prevented. As a result, a system, well safeguarded from damage, for sealing a pipeline system is created.

The segments of the protective ring can be connected to one another via one or more movable bolts and thereby connected to the protective ring. Preferably, adjacent segments are connected in pairs via a movable bolt, whereby said bolt is guided preferably axially in a guide so that in the connected state the guide is formed by a mutual guide at two different segments. In this way, the correspondence of the segments to one another in their position is established and thereby a very reliable and secure formation of the entire protective ring from a plurality of segments connected in this way is created in an especially reliable and simple manner. This use of segments to be connected in this way provides especially simple handling, because these segments can also be brought readily through narrow areas to the sealing site and there due to the limited size are rather simple to handle as a segment of an entire large protective ring. The connection via the mutual guide creates an especially simple to handle and reliable securing by the protective ring.

Moreover, it has proven especially successful to secure the bolt(s) in the connected state from inadvertent opening, which is achieved preferably by insertion of a cotter pin, adhesion, or rotation prevention or slippage prevention by wedging, or changing the surface. Other examples for protection from inadvertent loosening of the bolt are familiar to the person skilled in the art from the state of the art.

The protective ring or segments thereof or the collar can be formed so that it or they are pretensioned, i.e., that in the assembled state they exert a force radially outward and thereby against the inside of the pipe of the pipeline system and thereby produce a fixation. This makes sure, in addition, that a sliding behind by passing, conveyed objects in the pipeline system is largely ruled out. This design with pretensioning makes it possible to simplify the insertion of the collar or the protective ring, because during release by the pretensioning this achieves independently the pressing of the collar or of the protective ring against the inside of the pipe or in the gap and the objects located therein, e.g., the tube. The pretensioning in this case can be achieved by the protective ring, the segments, or the collar itself, or by an additional, integrated tension ring, or by a tension ring segment.

The collar and/or the protective ring can be made substantially of steel, particularly of ship steel, or stainless steel such as V4A steel. This steel proves to be very durable also under difficult external conditions, so that the system for sealing a pipeline system remains functional for a very long time. In addition, this material proves to be very dimensionally stable, particularly also resilient, so that there are advantageous effects to a particular extent. Apart from the use of steel, the use of carbon fiber- or fiberglass-reinforced plastics especially in regard to form stability has also proven especially suitable.

An inert gas or a non-reactive liquid can be selected as the fluid for the system for sealing a pipeline system. This assures that an undesirable explosion or damage to the components of the pipeline system or also of the sealing system does not occur. Nitrogen and carbon dioxide in particular have proven effective as inert gases, and water, particularly purified water, proved to be especially advantageous as the non-reactive liquid, because it forms no deposits and is not subject to aging states. The inflation of the tube of the invention in the novel system is especially efficient with the use specifically of a non-reactive liquid, because a great increase in pressure, which enables rapid and reliable sealing, can be achieved with this liquid. Under especially difficult conditions, the use of an inert gas has also proven to be especially good, because here a slow increase in tube volume results due to the compressibility of the gas, which better prevents damage to the pipe to be joined, e.g., by splitting of individual areas. A very effective sealing, which is lastingly stable, is achieved by the use of these inert gases or the non-reactive liquids.

Apart from the novel arrangement of the tube within the gap, which is to be sealed, there is also the novel option in addition to form the tube so that it is formed and provided for an arrangement on the inner wall in the area of the gap, in that it is formed as a band with a width greater than 10 cm. If it is filled with fluid in the interior of the pipe system to be sealed, thus this band-shaped tube with a radius width greater than 10 cm expands until it reaches the inner wall of the pipe system to be sealed and presses in the shape of a band with a width of 10 cm or more in a flat manner in the area to be sealed and by means of the pressing assures sealing of the area to be sealed, which forms in particular the gap between two abutting pipe ends. This design of the tube provides a universal system for sealing a pipeline system, which beyond the typical case of sealing in the area of abutting pipe ends can also seal cases in which a pipe part of the pipeline system has a crack or hole between its end pieces. This system of the invention for sealing thereby proves to be especially universal and simple to use. Specifically, a very durable and secure system is also provided in conjunction with a protective ring, which protects the band-shaped tube from damage on the interior.

It has also proven successful, moreover, to form the tube so that it is inserted with a part particularly with a chamber into a gap between pipe ends and with another particularly band-shaped part on the inside of the abutting pipes, therefore in the area of the pipe gap. This tube of the invention thereby has a T-shaped form in cross section. This design of the tube creates a special sealing, in one respect, within the gap and, moreover, on the inside of the tube in the area of the pipe ends to be sealed, which together assure an especially secure sealing. This sealing also proves to be very durable and reliable.

The insertion of the tube into the area to be sealed also proves to be not very complicated, because the tube is inserted in an empty or not fully filled state completely or at least partially—therefore with the part, to be inserted into the gap, of the tube with the T-shaped cross section. Next, filling is then carried out particularly if this part with its own chamber with the fluid is managed via its own valve, and then especially the other chamber(s) of the band-shaped part of the tube is (are) filled with fluid for sealing on the inside of the end areas of the pipe. This stepwise handling provides an especially advantageous, simple, but also reliable and secure arrangement of the tube in the area to be sealed, which leads to a very secure and durable sealing.

The protective ring of the system for sealing a pipeline system can be formed wavelike in cross section, which has a very positive effect on the stability of the protective ring particularly at a predefined material thickness. In addition, the protective ring due to the wave structure proves to be simple and secure to use also under difficult external conditions particularly in the case of a segmented structure.

By means of the wavelike formation of the protective ring, it is also possible to arrange a ring-shaped body, fillable with a fluid and connected to form a ring, in the troughs and thereby to improve the leak tightness of the system and/or the stability of the ring. In this regard, the ring-shaped body or bodies are formed in particular as a flexible tube, as a ring with a swellable material, or as a rigid pipe. An especially reliable sealing of the system can be achieved in a preferred manner by means of the arrangement of the ring-shaped body on the outside of the protective ring. Hereby, the use of swellable material is suitable, which is stimulated to swell in combination with water, which is available due to the leakage. Especially suitable for this is the so-called swelling rubber.

The insertion of swellable material into a flexible tube achieves an especially effective adaptation to the circumstances. The swellable material in this case is preferably introduced into the tube as small-scale, particularly small-grained swelling material, where stimulated by an agent, especially in the form of a supplied fluid, it can lead to an increase in volume or an increase in viscosity. An especially stable and rigid protective ring arrangement can be achieved by means of the arrangement of the ring-shaped body on the interior of the protective ring in a preferred manner and thereby the usability of the system of the invention can be increased further.

The system of the invention in its different forms proves to be especially simple to handle. Moreover, however, it also proves to be a very reliable and durable sealing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
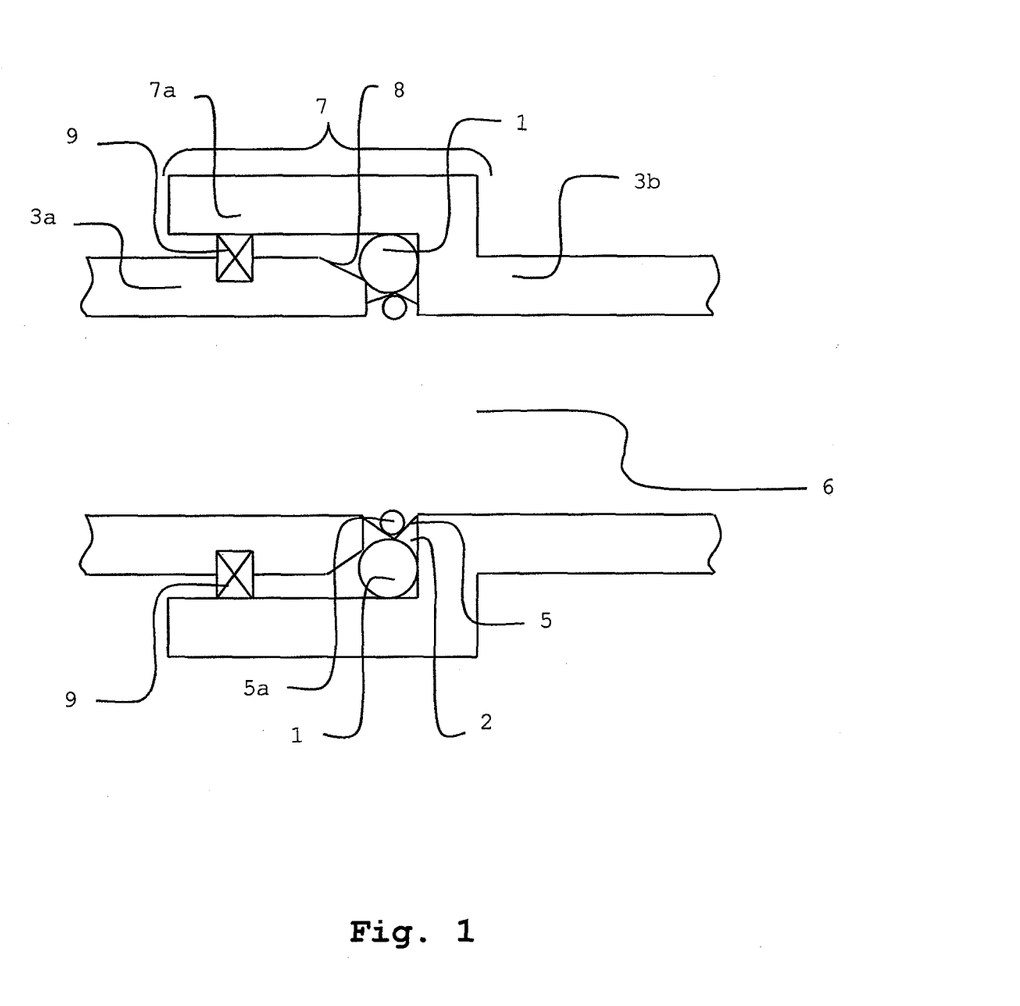
FIG. 1 shows in a longitudinal section a section of a pipeline system, which is sealed with the system of the invention.

An exemplary design of the system of the invention for sealing a pipeline system with a fluid-tight, filled tube is shown in FIG. 1. The novel tube 1 of the system of the invention was inserted between the two pipe ends 3a, 3b, which form a gap 2, in a non-fluid-filled state. Then, tube 1 was filled with the fluid, liquid water, as a result of which it increased in its diameter and placed itself against pipe ends 3a, 3b and sealed gap 2. Interior 6 of the pipeline system is sealed by fluid-filled tube 1 from the exterior space.

The pipeline system as a detail and the system for sealing the pipeline system in the fluid-filled and thereby sealed state are shown in FIG. 1. Pipeline end 3a is formed at its outer side with a phase 8 and pipeline end 3b is formed so that it forms a bell socket in conjunction with the other pipeline end 3a. A plastic seal 9, which enables sealing of the two pipe ends from one another in the radial direction, is arranged between bell 7a of bell socket 7. Said plastic seal 9 is inserted in an annular groove on the outside of interior pipe end 3a.

During the insertion of pipe end 3a into bell 7a, a non-uniform gap 2 forms not infrequently between pipeline ends 3a, 3b, which in part also leads to non-tight sealing by plastic sealing element 9. In this case, the sealing is achieved by tube 1 of the invention, closed to form a ring. The tube 1 is inserted in gap 2 of the area of bell socket 7, in that phase 8 forms an expanded ring-shaped volume, which has a larger free space than the remaining gap 2 between pipe ends 3a, 3b in the area of bell socket 7. If tube 1 after the insertion into this expanded area of phase 8 is filled with fluid, it thus fills this area even more and by this formation a sliding of fluid-filled tube 1 out of this space into the remaining narrowed gap 2 is ruled out, so that a reliable and durable positioning of tube 1 exists between pipe ends 3a, 3b. Fluid-filled tube 1 in its outer form adapts to the available ring-shaped volume and presses sealingly against the walls in this area. As a result, a lateral and in addition also radial sealing by fluid-filled tube 1 is achieved in the area of bell socket 7. In this way, the possibly present sealing effect of plastic seal 9 is supplemented so that an especially reliable and durable sealing is present. The insertion of tube 1 in the non-fluid-filled state or slightly fluid-filled state is simple to realize.

After filling of tube 1 with the fluid, a collar 5 is inserted on the inner side of tube 1 in gap 2 between the two pipe ends 3a, 3b. Said collar 5 is realized V-shaped from resilient V4A steel. A tension ring 5a, which tensions the collar radially outward and thereby presses against tube 1 and thereby assures that tube 1 comes to lie lastingly in the gap, is inserted in the groove formed by V-shaped collar 5. Collar 5 due to its resilient formation from steel lies laterally against the two pipe ends 3a, 3b, so that it is assured that no objects can penetrate between collar 5 and pipe ends 3a, 3b and damage tube 1, in particular make it not tight. Because of the V-shaped design, collar 5 is pressed resiliently against pipe ends 3a, 3b and thereby advantageously adapts to the outer circumstances and dimensions of gap 2.

A very reliable sealing by fluid-filled tube 1 in the area of bell socket 7 with phase 8 is provided by the design shown in FIG. 1 of the system of the invention for sealing a pipeline system; said tube is also protected lastingly from damage by dangerous objects conveyed past it by the realization of collar 5 with spring ring 5a. Thereby, an especially secure and durable sealing of a pipe system is provided by the system of the invention.

Figure 2:
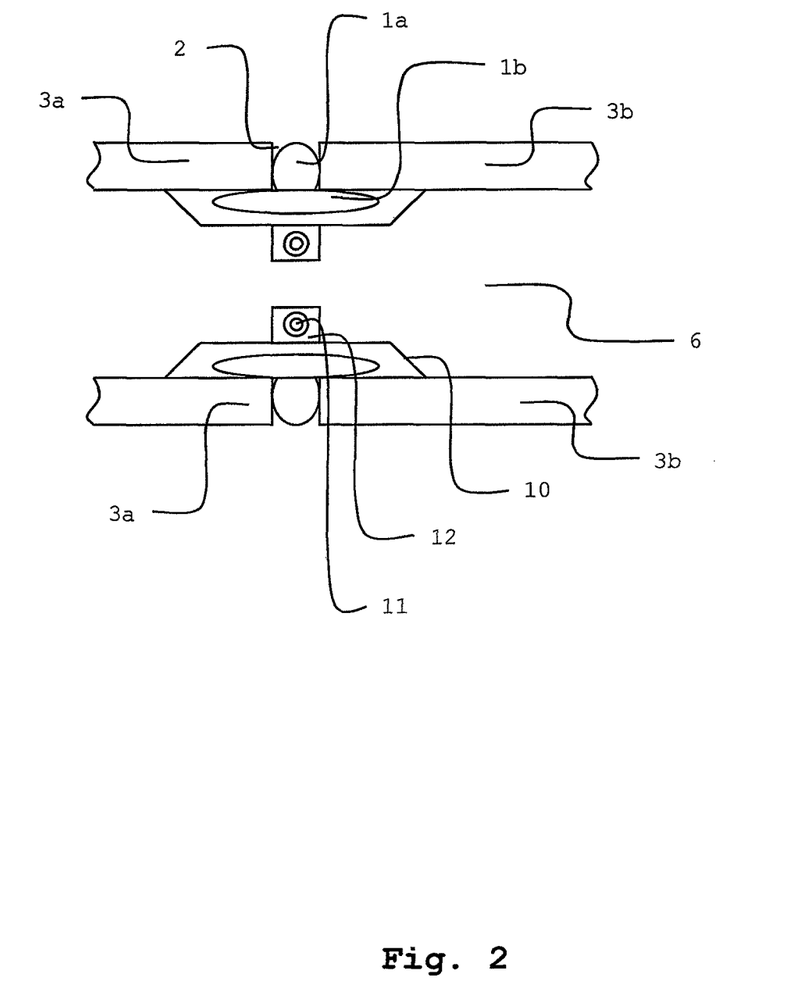
FIG. 2 shows another exemplary embodiment of the system of the invention in a longitudinal section of a section of a sealed pipeline system.

Another exemplary embodiment of the system of the invention for sealing a pipeline system is shown in FIG. 2. The two pipe ends 3a, 3b thereby abut with the same diameter, forming a gap 2. If the two pipes of the pipeline system are joined together imprecisely in the same direction and without an offset, a wedge-shaped gap 2 forms, which regularly leads to problems and troublesome, unacceptable leaks.

It has proven successful for sealing in this case to insert novel tube 1 of the system of the invention for sealing a pipeline system in the area of gap 2. In FIG. 2, said tube 1 is shown in the fluid-filled state, therefore in the sealed pipe system. Tube 1 made of curable material has two fluid-filled chambers 1a, 1b. Chamber 1a is arranged so that it comes to rest in gap 2 between the two pipe ends 3a, 3b and seals these laterally from each other, whereas second chamber 1b is arranged on the inner wall in interior space 6 of the pipeline system. Chamber 1b in this case is formed band-shaped and filled with fluid so that a band-shaped ring is formed, which lies flat against the inner side of pipe ends 3a, 3b and by means of radial pressure exerted outwardly due to the fluid filling tightly seals the inner wall of pipeline ends 3a, 3b. Due to this flat, ring-shaped sealing with the aid of band-shaped chamber 1b, there is an additional sealing in the radial direction in addition to the lateral sealing in gap 2 between the two pipe ends 3a, 3b. A very reliable and secure sealing of the pipeline system is provided by this combination of the two seals due to the two chambers 1a, 1b.

In the non-fluid-filled state, the two chambers 1a, 1b and thereby tube 1 can be brought in a simple manner very compactly to the site of the leaking pipeline system and there chamber 1a can be inserted in gap 2. Then, first, chamber 1a is filled with fluid and then second chamber 1b, which assures a very secure positioning and thereby a reliable double sealing. Tube 1 shows in the fluid-filled state a T-shaped cross section, which results from the two connected chambers 1a, 1b.

To prevent mechanical or also chemical damage by aggressive conveyed substances, the tube formed by chambers 1a, 1b is secured on the inside wall by a protective ring 10 made of stainless steel. Protective ring 10 surrounds tube 1 on its inner side. Bolts 11 in guides 12 are arranged on the inner side of protective ring 10, whereby guides 12 are formed by brackets with circular guide holes 12. A plurality of segment-overlapping bolts 11, which assure the correctly positioned joining together of the segments and in addition protect the connected segments from inadvertent opening of the segment connection, are inserted in these guides 12. In the connected state, these segments form closed retaining ring 10. The securing against inadvertent opening is assured by cotter pins, which are inserted in recesses in bolts 11 and prevent an inadvertent movement of bolts 11.

In one respect, a very secure sealing realization is provided by this exemplary design of the system of the invention for sealing a pipeline system and a very durable sealing is also assured in conjunction with retaining ring 10 of the system.

Figure 3:
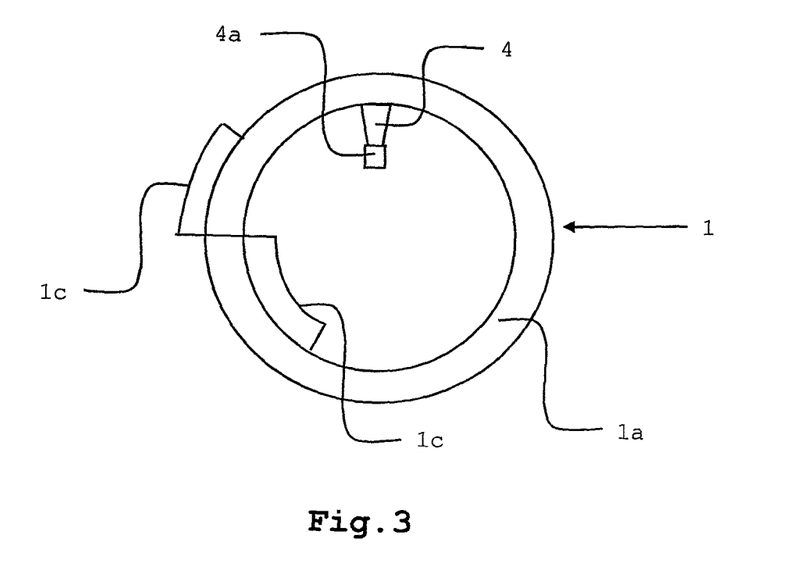
FIG. 3 shows in a schematic illustration the structure of an exemplary tube of the invention.

A schematic illustration of an exemplary tube 1, connected to form a closed ring and made of curable material of rubber, is shown in FIG. 3. Tube 1 is shown here in the fluid-filled state. The interior of the tube, chamber 1a, is filled with fluid. The fluid in chamber 1a was introduced via feed element 4, which is provided with a check valve 4a. As a result, a simple and reliable, less laborious introduction of the fluid for increasing the volume of tube 1 is provided.

To give tube 1 the ring-shaped form, the tube, which is not initially closed to form a ring and has at both ends tube ends 1c in the form of an end face without an integrated chamber, was connected to form a ring. These tube ends 1c in this exemplary design have a flat form and project collar-like over the closed chamber 1a, which can be filled with fluid.

Tube ends 1c are cured with the aid of a curing agent with the respective other end of tube 1 and here in the area of chamber 1a of the other tube end, and thereby connected similar to welding of a plastic. By means of this type of connection, a very secure and durable connection of tube ends 1c arises, which now determine overall the shape of a ring-shaped tube 1. This design of tube 1 as needed allows bringing the suitable tube in a relatively simple manner to the site of the pipeline system to be sealed, there depending on the selection of suitable tube 1 to connect it to form a closed ring and insert it in gap 2 or in the area of gap 2.

The length of chamber 1a and thereby the length of the ring or its ring diameter can also be adapted to the particular situation with the aid of the curability of the material of tube 1, so that the number of the different basically available lengths of tube 1 can be greatly reduced. This leads to simplified logistics and thereby to a more manageable system of the invention for sealing a pipeline system.

The system of the invention for sealing is impressive due to the reliable and durable sealing of a pipeline system, particularly in the area of the pipe ends. In addition, it proves to be especially simple and not very laborious in its handling.

Figure 4:
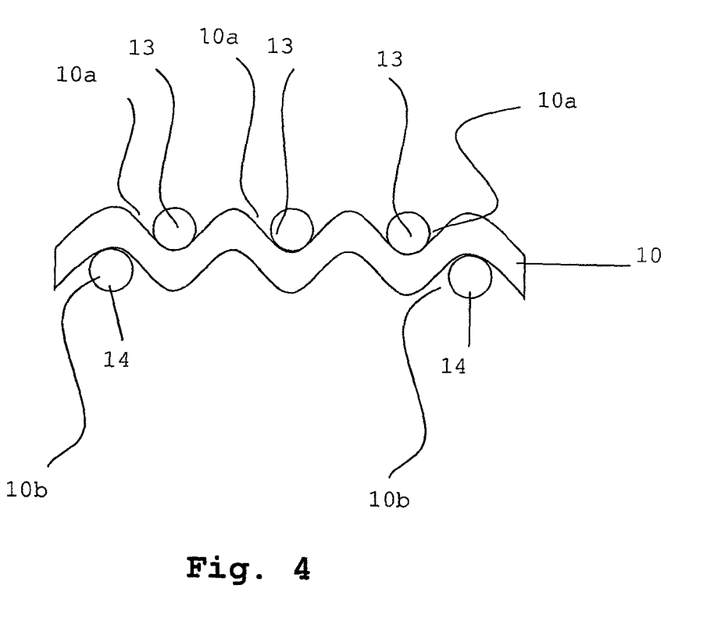
FIG. 4 shows in cross section the structure of an exemplary protective ring of the system of the invention.

An exemplary protective ring 10 can be seen in FIG. 4. It is formed wavelike in cross section from ship steel. The wave structure creates an especially stable formation of protective ring 10, which is due to its low weight and thereby provides an especially advantageous application option. In troughs 10a on the inner side of protective ring 10, a plurality of flexible hollow rings 13 are arranged, which are filled with inert gas and thereby increase in radius and expand protective ring 10 radially and thereby press protective ring 10 sealingly against the pipeline system to be sealed. Further, FIG. 4 shows two ring-shaped tubes 14, which are arranged on the outside of protective ring 10 in the outer troughs 10b and which are filled with swellable fine-grained material, which is stimulated to swell by the introduced water, and thereby successfully seals the system of the invention. Due to the swellable, fine-grained material, it is possible also in the swollen state to enable a sufficient flexibility of tubes 14 and thereby to assure adaptation to different outer circumstances. The shown exemplary protective ring assures an especially good sealing performance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for sealing two linearly connected pipes of a pipeline system, the system comprising:
    a single layer fluid-tight tube that is inserted into an area of a gap between the two linearly connected pipes of the pipeline system to be sealed;
    a feed element having a valve for introducing a fluid into the tube; and
    a pump for conveying the fluid, the pump being connectable to the feed element,
    wherein the fluid is introduced into the tube for increasing the volume of the tube, and thereby the tube filled with the fluid directly contacts and presses walls of the two linearly connected pipes and seals the gap between the two linearly connected pipes, and
    wherein the tube contacts the pipes at at least three surfaces of the pipes.

2. The system for sealing a pipeline system according to claim 1, wherein the tube contains curable or weldable material.

3. The system for sealing a pipeline system according to claim 2, wherein the tube is connectable to form a ring by curing or welding.

4. The system for sealing a pipeline system according to claim 1, wherein the tube is formed of a material with a fabric insert of textile or metal.

5. The system for sealing a pipeline system according to claim 4, wherein the fabric insert is formed multilayer.

6. The system for sealing a pipeline system according to claim 1, wherein the tube is formed and provided for insertion into the gap.

7. The system for sealing a pipeline system according to claim 6, wherein the tube has a resilient collar that is configured to be insertable in the gap between the tube and an interior of the pipeline system.

8. The system for sealing a pipeline system according to claim 7, wherein the resilient collar is formed substantially of steel, particularly ship or stainless steel such as V4A steel.

9. The system for sealing a pipeline system according to claim 7, wherein the resilient collar is pretensioned.

10. The system for sealing a pipeline system according to claim 1, wherein the tube is formed and provided for arrangement on an inside wall in the area of the gap so that the tube is formed band-shaped with a width greater than 10 cm and in a fluid-filled state covers the gap on the inside wall in a flat manner.

11. The system for sealing a pipeline system according to claim 1, wherein the tube has a plurality of chambers extending in a longitudinal direction of the tube.

12. The system for sealing a pipeline system according to claim 1, wherein the pipes to be sealed from one another form a coupling, whose inner pipe has a pipe end with a phase disposed at the outer diameter.

13. The system for sealing a pipeline system according to claim 1, wherein the pipes to be sealed from one another form a bell socket, with a plastic seal between the bell socket and an associated other pipe end.

14. The system for sealing a pipeline system according to claim 1, further comprising a protective ring arranged on an inside wall in an area of the pipe gap provided with the tube.

15. The system for sealing a pipeline system according to claim 14, wherein the protective ring is formed from a plurality of segments, which are connectable to one another to form the protective ring with an outside diameter corresponding to an inside diameter of the annular gap to be sealed.

16. The system for sealing a pipeline system according to claim 15, wherein the segments are connectable by movable bolts to form the protective ring.

17. The system for sealing a pipeline system according to claim 16, wherein the bolts are guided axially in a guide, and wherein, in a connected state, the guide is formed by a common guide on two different segments.

18. The system for sealing a pipeline system according to claim 17, wherein the bolts in the connected state are secured from inadvertent opening.

19. The system for sealing a pipeline system according to claim 14, wherein the protective ring and/or individual segments of the protective ring are pretensioned.

20. The system for sealing a pipeline system according to claim 14, wherein the protective ring is formed wavelike in cross section.

21. The system for sealing a pipeline system according to claim 1, wherein the fluid is an inert gas, nitrogen, carbon dioxide, a non-reactive liquid, or liquid water.

22. The system for sealing a pipeline system according to claim 1, further comprising
    a protective ring arranged on an inside wall in an area of the pipe gap provided with the tube; and
    a ring fillable with a fluid arranged on the protective ring.

23. A system for sealing a pipeline system, the system comprising:
    a fluid-tight tube configured for insertion into an area of a gap between two pipes of the pipeline system to be sealed;
    a feed element having a valve for introducing a fluid into the tube;
    a pump for conveying the fluid, the pump being connectable to the feed element; and
    a protective ring arranged on an inside wall in an area of the pipe gap provided with the tube,
    wherein the protective ring is formed wavelike in cross section, and
    wherein a ring fillable with a fluid is arranged in one or more troughs of the protective ring.

* * * * *